(12) United States Patent
Shin et al.

(10) Patent No.: US 9,859,538 B2
(45) Date of Patent: Jan. 2, 2018

(54) FILM PRODUCTION METHOD AND FILM PRODUCTION DEVICE

(71) Applicant: Sumitomo Chemical Company, Limited, Tokyo (JP)

(72) Inventors: Akihiko Shin, Daegu (KR); Rikuri Uejima, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/280,254

(22) Filed: Sep. 29, 2016

(65) Prior Publication Data

US 2017/0092914 A1    Mar. 30, 2017

(30) Foreign Application Priority Data

Sep. 30, 2015  (JP) ................................ 2015-194108
Jul. 14, 2016  (JP) ................................ 2016-139434

(51) Int. Cl.

| | |
|---|---|
| *C23C 28/00* | (2006.01) |
| *H01M 2/14* | (2006.01) |
| *B32B 27/00* | (2006.01) |
| *C08J 5/22* | (2006.01) |
| *H01M 10/0525* | (2010.01) |
| *H01M 2/16* | (2006.01) |

(52) U.S. Cl.
CPC ............. *H01M 2/145* (2013.01); *B32B 27/00* (2013.01); *C08J 5/22* (2013.01); *C23C 28/00* (2013.01); *H01M 2/166* (2013.01); *H01M 2/1653* (2013.01); *H01M 2/1686* (2013.01); *H01M 10/0525* (2013.01)

(58) Field of Classification Search
CPC ............ B08B 3/041; B05D 3/10; C23C 28/00
See application file for complete search history.

(56) References Cited

U.S. PATENT DOCUMENTS 2,219,620 A * 10/1940 Brunk .................... G03D 3/135
                                                    396/620
2004/0056380 A1   3/2004 Fukuzawa et al.
2014/0077405 A1   3/2014 Funaoka

FOREIGN PATENT DOCUMENTS

| CN | 1455708 A | 11/2003 |
|---|---|---|
| CN | 103459478 A | 12/2013 |
| JP | S5091321 A | 7/1975 |
| JP | H0966259 A | 3/1997 |
| JP | H9314084 A | 12/1997 |
| JP | 2001170933 A | 6/2001 |

(Continued)

OTHER PUBLICATIONS

Office Action (Japanese language) dated Apr. 12, 2016 in JP Application No. 2015194108.

(Continued)

*Primary Examiner* — Nathan Empie
(74) *Attorney, Agent, or Firm* — Panitch Schwarze Belisario & Nadel LLP

(57) ABSTRACT

A film production method includes the steps of: (i) passing a heat-resistant separator above rollers located above a washing tank; (ii) lowering another roller into water through a space between the rollers; and (iii) moving at least one of the rollers and the another roller so as to increase a surface area by which the heat-resistant separator is in contact with the another roller. The method resolves a problem that occurs to a film which is being washed.

15 Claims, 8 Drawing Sheets

(56) References Cited

FOREIGN PATENT DOCUMENTS

| | | |
|---|---|---|
| JP | 2001228594 A | 8/2001 |
| JP | 2004-109698 A | 4/2004 |
| JP | 2007105662 A | 4/2007 |
| JP | 2009-230131 A | 10/2009 |
| JP | 2011011150 A | 1/2011 |
| KR | 2007-0048214 A | 5/2007 |

OTHER PUBLICATIONS

Office Action dated Apr. 6, 2017 in CN Application No. 201610866080.8.

Office Action issued Oct. 18, 2017 in CN Application No. 201610866080.8.

* cited by examiner

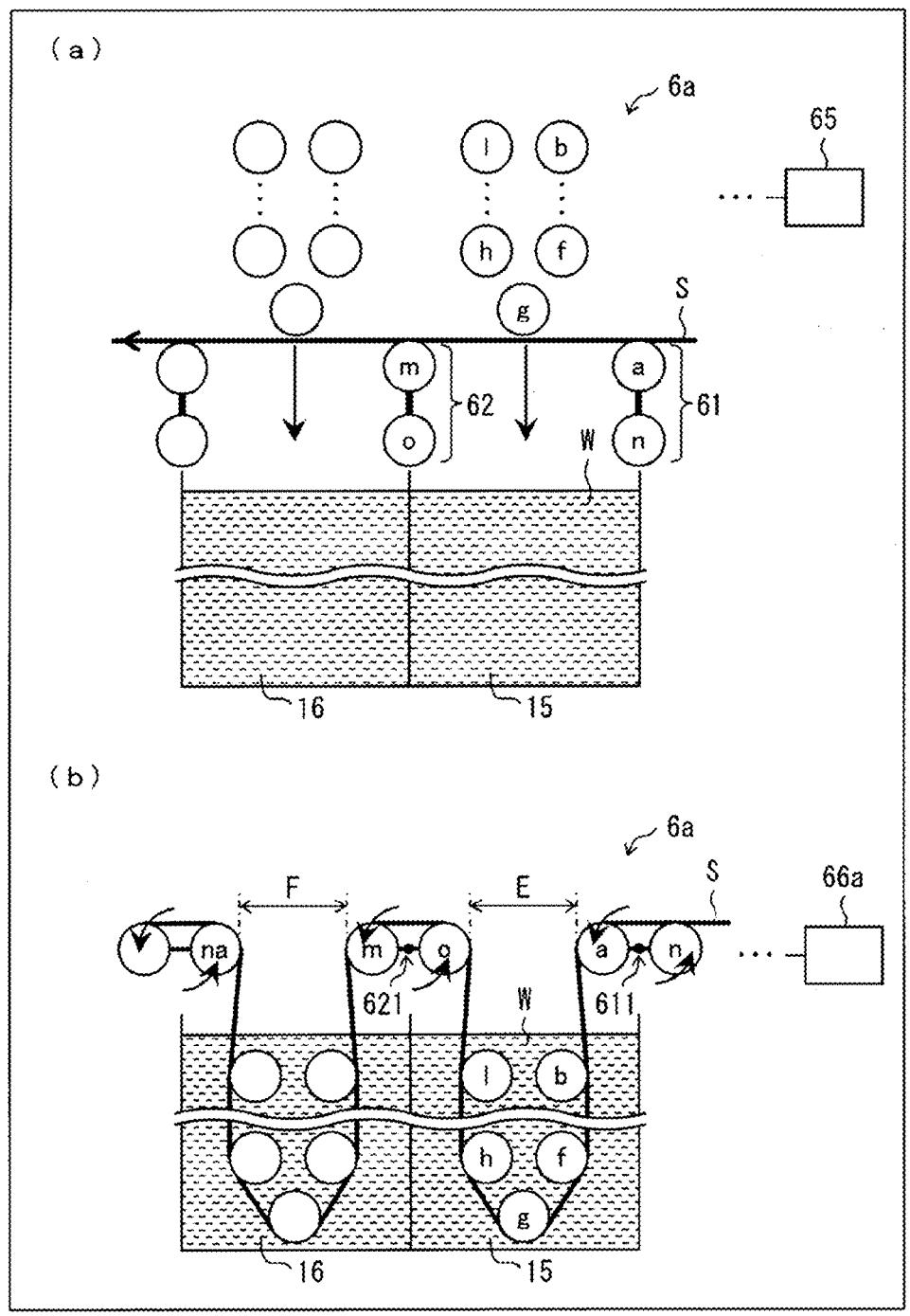

FILM PRODUCTION METHOD AND FILM PRODUCTION DEVICE

This Nonprovisional application claims priority under 35 U.S.C. §119 on Patent Application No. 2015-194108 filed in Japan on Sep. 30, 2015 and on Patent Application No. 2016-139434 filed in Japan on Jul. 14, 2016, the entire contents of which are hereby incorporated by reference.

TECHNICAL FIELD

The present invention relates to a method and a device for producing a film such as a separator for use in a battery such as a lithium ion secondary battery.

BACKGROUND ART

A lithium-ion secondary battery includes therein a cathode and an anode which are separated by a separator that is in a form of film and is porous. A process of producing the separator includes a washing step of removing an unnecessary substance from the film which has been prepared in advance.

For example, if not limited to a separator, techniques disclosed in Patent Literatures 1 and 2 are known as techniques to wash a sheet or a film. Patent Literature 1 discloses a washing tank including two tanks for roughly and thoroughly washing a heat-sealing multilayer sheet in sequence. Patent Literature 2 discloses a washing section having a plurality of stages for soak-washing and spray-washing an optical plastic film in sequence.

CITATION LIST

Patent Literatures

Patent Literature 1
Japanese Patent Application Publication, Tokukai, No. 2001-170933 (Publication Date: Jun. 26, 2001)
Patent Literature 2
Japanese Patent Application Publication, Tokukai, No. 2007-105662 (Publication Date: Apr. 26, 2007)

SUMMARY OF INVENTION

Technical Problem

A porous separator and an intermediate product film thereof have mechanical strength which is lower than that of a simple non-porous film. This tends to cause problems such as folds, creases, tears, and meandering during the process of producing the porous separator and the intermediate product film, particularly during a washing step. If these problems occur, then efficiency in producing a film decreases. However, neither Patent Literature 1 nor Patent Literature 2 addresses these problems. It is an object of the present invention to remove an unnecessary substance from a film which, is being washed, while problems that occur to the film being washed are resolved.

Solution to Problem

In order to attain the object, a film production method of the present invention is a method for producing a film, the method involving a transfer, in a liquid provided in a liquid tank, of a film which is long, the method including the steps of: (i) passing the film above a first roller and a second roller which are located above the liquid tank; (ii) lowering at least one third roller from above the film into the liquid through a space between the first roller and the second roller; and (iii) rearranging at least one of the first roller, the second roller, and the at least one third roller so as to increase a surface area by which the film is in contact with the at least one third roller, the steps (i) through (iii) being carried out before the transfer of the film.

A film production device of the present invention, is a film production device including a transferring device for transferring, in a liquid provided in a liquid tank, a film which is long, the film production device including; a first roller and a second roller which are located above the liquid tank; at least one third roller; a power device for lowering the at least one third roller from above the film into the liquid through a space between the first roller and the second roller; and a rearranging device for rearranging at least one of the first roller, the second roller, and the at least one third roller so as to increase a surface area by which the film is in contact with the at least one third roller.

Advantageous Effects of Invention

The present invention makes it possible to efficiently produce a film on which a remaining remove-target substance is restricted, while a problem that occurs to the film is inhibited.

BRIEF DESCRIPTION OF DRAWINGS

FIG. 10 is a set of schematic views for describing a film production method in accordance with Embodiment 5.

DESCRIPTION OF EMBODIMENTS

[Basic Configuration]
The description below deals sequentially with a lithium-ion secondary battery, a separator, a heat-resistant separator, and a method for producing a heat-resistant separator.
(Lithium Ion Secondary Battery)
A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
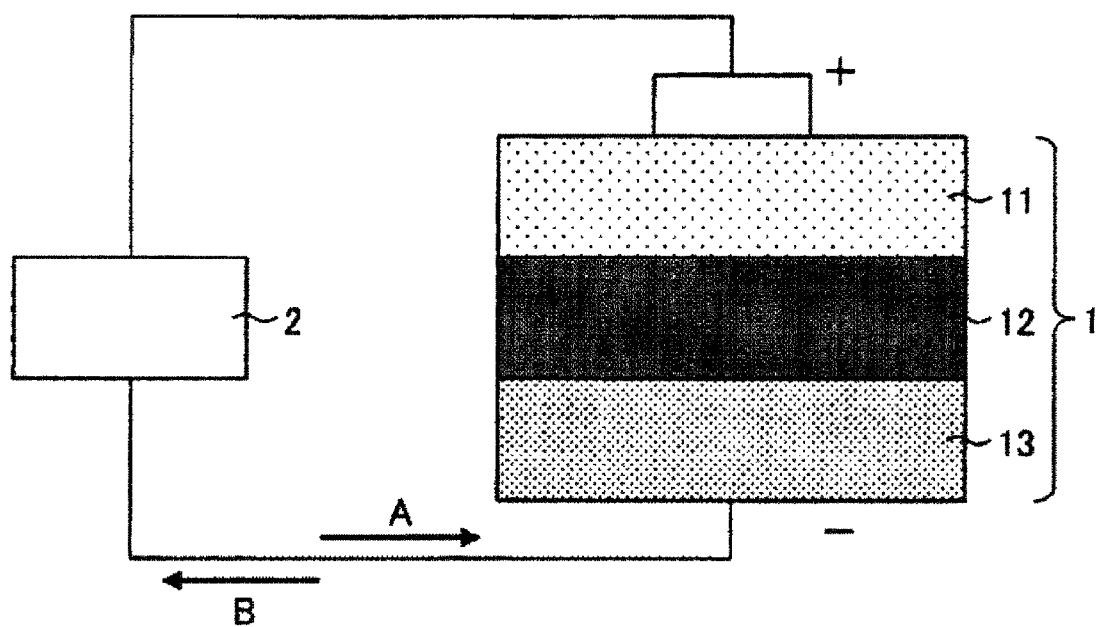
FIG. 1 is a schematic view illustrating a cross sectional configuration of a lithium-ion secondary battery.

FIG. 1 is a diagram schematically illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1. The separator 12 is a porous film, which separates the cathode 11 and the anode 13, allowing lithium ions to move between the cathode 11 and the anode 13. The separator 12 contains, for example, polyolefin such as polyethylene or polypropylene as a material.

Figure 2:
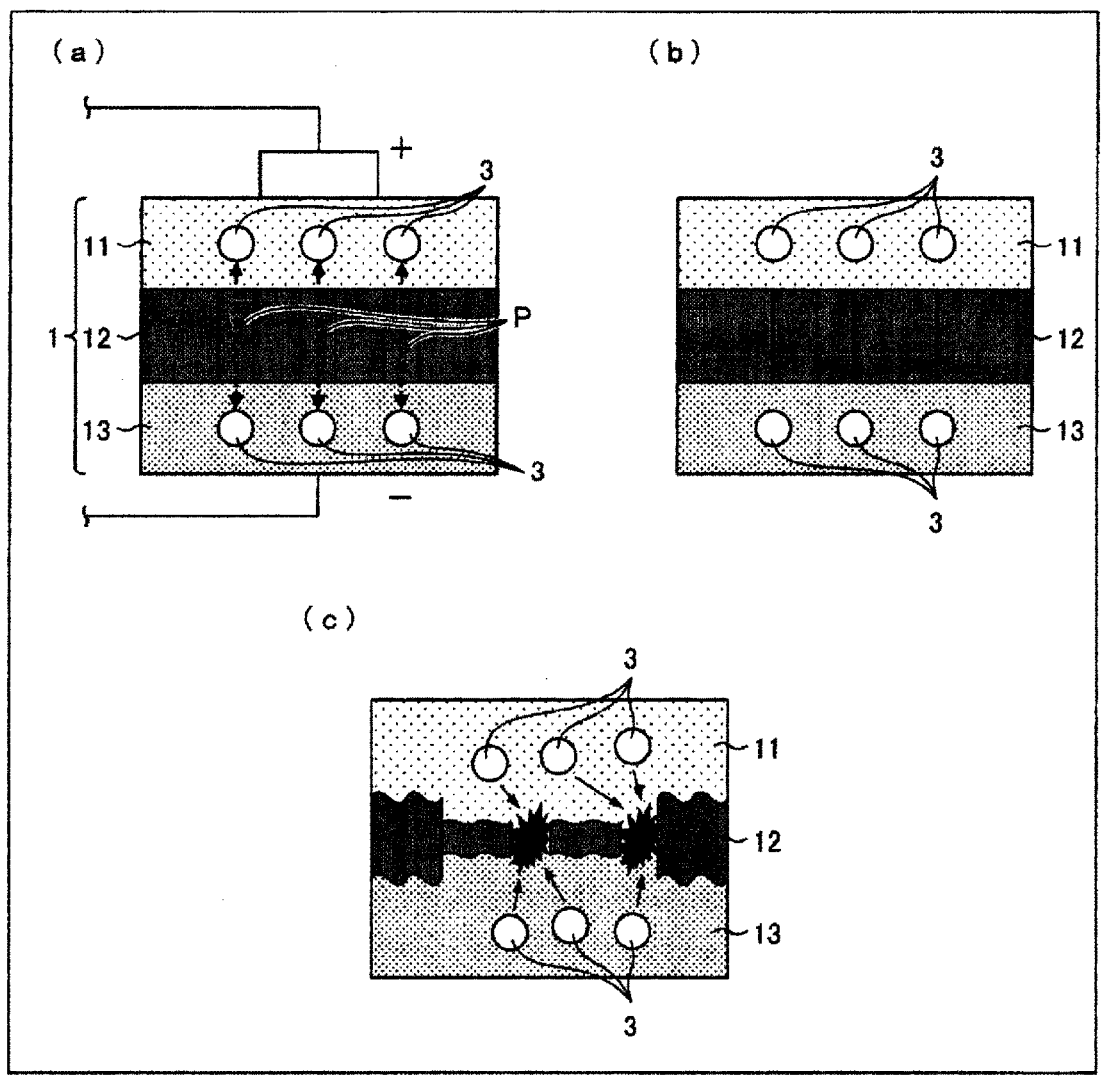
FIG. 2 is a schematic view illustrating a detailed configuration of the lithium-ion secondary battery illustrated in FIG. 1.

FIG. 2 provides diagrams each schematically illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in (b) of FIG. 2. As a result, the separator 12 shrinks. This stops the movement of the lithium ions 3, and consequently stops the above temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving. Consequently, the temperature continues rising.

(Heat-Resistant Separator)

Figure 3:
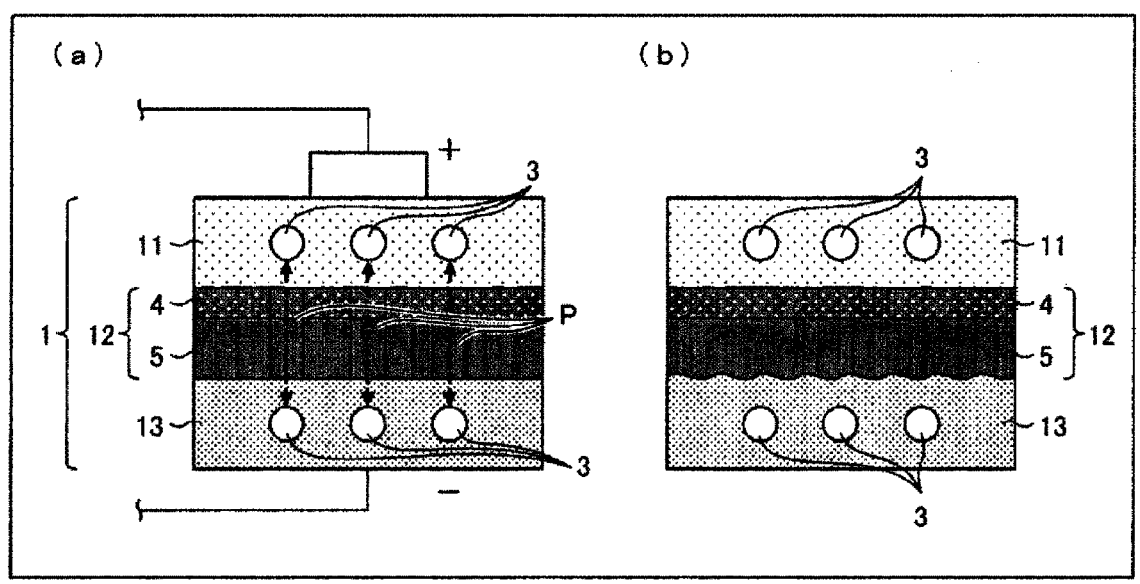
FIG. 3 is a schematic view illustrating another configuration of the lithium-ion secondary battery illustrated in FIG. 1.

FIG. 3 provides diagrams schematically illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen.

As illustrated in (a) of FIG. 3, the separator 12 can be a heat-resistant separator that includes a porous film 5 and a heat-resistant layer 4. The heat-resistant layer 4 is laminated on a surface of the porous film 5 which surface is on a cathode 11 side. Note that the heat-resistant layer 4 can alternatively be laminated on a surface of the porous film 5 which surface is on an anode 13 side, or both surfaces of the porous film 5. Further, the heat-resistant layer 4 is provided with pores which are similar to the pores P, Normally, the lithium ions 3 move back and forth through the pores P and the pores of the heat-resistant layer 4. The heat-resistant layer 4 contains, for example, wholly aromatic poly amide (aramid resin) as a material.

As illustrated in (b) of FIG. 3, even in a case where the temperature of the lithium-ion secondary battery 1 sharply rises and as a result, the porous film 5 melts or softens, the shape of the porous film 5 is maintained bee arise the heat-resistant layer 4 supports the porous film 5. Therefore, such a sharp temperature rise results in only melting or softening of the porous film 5 and consequent blocking of the pores P. This stops movement of the lithium ions 3 and consequently stops the above-described excessive discharging or excessive charging. In this way, the separator 12 can be prevented from being destroyed.

(Steps of Producing Separator, Heat-Resistant Separator)

How to produce the separator and heat-resistant separator of the lithium-ion secondary battery 1 is not specifically limited, and the separator and heat-resistant separator can be produced by a well-known method. The following discussion assumes a case where the porous film 5 contains polyethylene as a main material. However, even in a case where the porous film 5 contains another material, similar steps can still be applied to production of the separator 12 (heat-resistant separator).

For example, it is possible to employ a method including the steps of first forming a film by adding an inorganic filler or plasticizer to a thermoplastic resin, and then washing the film with an appropriate solvent to remove the inorganic filler or plasticizer. For example, in a case where the porous film 5 is a polyolefin separator made of a polyethylene resin containing ultrahigh molecular weight polyethylene, it is possible, to produce the separator 12 by the following method.

This method includes (1) a kneading step of obtaining a polyethylene resin composition by kneading an ultrahigh molecular weight polyethylene and an inorganic filler (for example, calcium carbonate or silica) or plasticizer (for example, a low molecular weight poly olefin or liquid paraffin), (2) a rolling step of forming a film, with, the polyethylene resin composition, (3) a removal step of removing the inorganic filler or plasticizer from the film obtained in the step (2), and (4) a stretching step of obtaining the porous film 5 by stretching the film obtained in the step (3). The step (4) may alternatively be carried out between the steps (2) and (3).

In the removal step, many fine pores are provided in the film. The fine pores of the film stretched in the stretching step become the above-described pores P. The porous film 5 formed as a result is a polyethylene microporous film having a prescribed thickness and a prescribed air permeability (that is, a separator 12 not having a heat-resistant layer).

Note that in the kneading step, 100 parts by weight of the ultrahigh molecular weight polyethylene, 5 parts by weight to 200 parts by weight, of a low-molecular weight polyolefin having a weight-average molecular weight of not more than 10000, and 100 parts by weight to 400 parts by weight of the inorganic filler can be kneaded.

Thereafter, in a coating step, the heat-resistant layer 4 is formed on a surface of the porous film 5. For example, on the porous film 5, an aramid/NMP (N-methylpyrrolidone) solution (coating solution) is applied (applying step) and solidified (solidifying step), and thereby, the heat-resistant layer 4 that is an aramid heat-resistant layer is formed. The heat-resistant layer 4 can be provided on only one surface or both surfaces of the porous film 5.

In the coating step, a polyvinylidene fluoride/dimethylacetamide solution (coating solution) may be applied (applying step) to a surface of the porous film 5 and solidified (solidifying step) to form an adhesive layer on the surface of the porous film 5. The adhesive layer can be provided on only one surface or both surfaces of the porous film 5.

In this specification, a layer, which has a function such as adhesiveness to an electrode or heat resistance to a temperature equal to or higher than a melting point of polyolefin, is referred to as "functional layer".

A method for coating the porous film 5 with a coating solution is not specifically limited as long as uniform wet coating can be performed by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film and/or a solid-content concentration in the coating solution.

It is possible to use a resin film, a metal belt, a drum or the like as a support with which the porous film 5 is fixed or transferred in coating.

As described above, it is possible to produce the separator 12 (heat-resistant separator) in which the heat-resistant layer 4 is laminated on the porous film 5. Thus produced separator is wound on a cylindrical core. Note that a subject to be produced by the above production method is not limited to the heat-resistant separator. The above production method does not necessarily include the coating step. In a case where the method includes no coating step, the subject to be produced is a separator having no heat-resistant layer.

Embodiment 1

Figure 4:
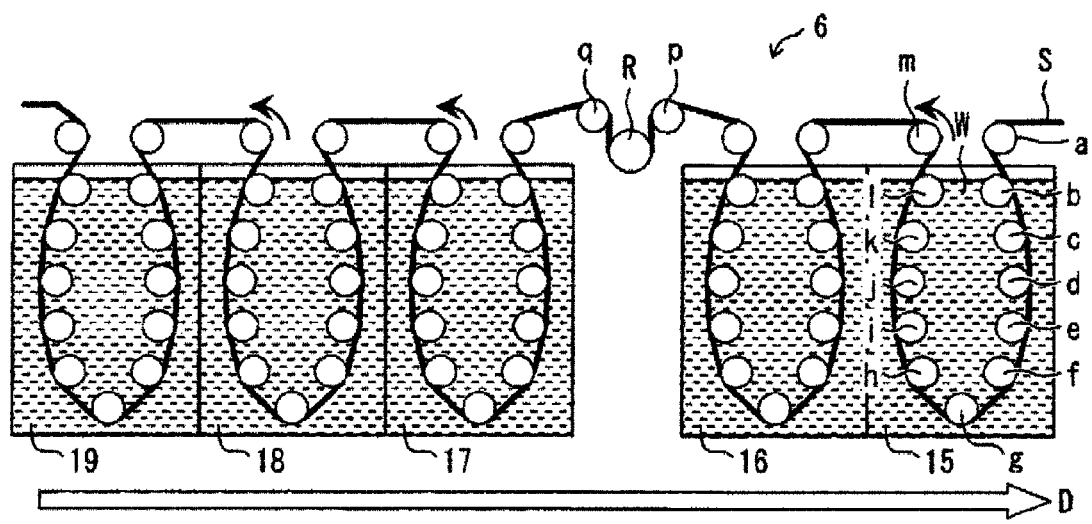
FIG. 4 is a cross-sectional view illustrating a configuration of a washing device used in a washing method in accordance with Embodiment 1.

The following description will discuss Embodiment 1 of the present invention, with reference to FIG. 4.

In Embodiment 1, a washing method for washing a heat-resistant separator, which is a long and porous battery separator, is described. A heat-resistant layer of the heat-resistant separator is formed by applying an aramid/NMP (N-methylpyrrolidone) solution (coating solution) to a porous film. In this case, NMP (remove-target, substance) which is a solvent sinks into pores of the porous film.

An air permeability of the heat-resistant separator in which NMP remains in the pores is lower than that of a heat-resistant separator in which no NMP remains in pores. As the air permeability is lower, movement of lithium ions of a lithium-ion secondary battery including the heat-resistant separator is further interfered with, and consequently output of the lithium-ion secondary battery decreases. Therefore, it is preferable to wash the heat-resistant separator so that NMP does not remain in the pores of the heat-resistant separator.

<<Configuration in which Heat-Resistant Separator is Washed with Use of Multi-Stage Washing Tank>>

(Washing Tank)

FIG. 4 is a cross-sectional view illustrating a configuration of a washing device 6 used in a washing method in accordance with Embodiment 1.

As illustrated in FIG. 4, the washing device 6 includes washing tanks 15 through 19. Each of the washing tanks 15 through 19 is filled with washing water W (liquid).

Further, the washing device 6 includes a plurality of rollers which are rotatable for transferring a heat-resistant separator S. Among the plurality of rollers, rollers a through m are rollers for transferring the heat-resistant separator S which is to be washed in the washing tank 15.

The heat-resistant separator S which has been transferred from a step (for example, coating step) which is upstream from a washing step passes through, via the rollers a through m, the washing water W (hereinafter referred to as "water") filling the washing tank 15. The rollers a through m (transferring roller) define a transferring path of the heat-resistant separator S in the washing tank 15. In the washing tanks 16 through 19, the heat-resistant separator S is washed in a manner similar to that in the washing tank 15.

(Driving Roller)

The washing device 6 further includes a driving roller R and auxiliary rollers p and q for applying driving force to the heat-resistant separator S between washing tanks. The auxiliary rollers p and q define an angle (so-called "holding angle") at which the heat-resistant separator S makes contact with the driving roller R. Although the driving roller R and the auxiliary rollers p and q can be provided in water, the driving roller R and the auxiliary rollers p and q are preferably provided between washing tanks as illustrated in FIG. 4, because it is not necessary to give a water-proof treatment to the rollers.

As described above, driving force for transferring the heat-resistant separator S is applied between a position of the roller a for the washing tank 15 (first washing tank) and a position of a roller (corresponding to the roller m) for the washing tank 19 (second washing tank). Here, the "position of the roller a for the washing tank 15" is a position at which the heat-resistant separator S is brought into the washing tank 15. The "position of a roller (corresponding to the roller m) for the washing tank 19" is a position at which the heat-resistant separator S is taken out from the washing tank 19.

The driving force is preferably applied to the heat-resistant separator S between (i) a position which is of a roller (corresponding to the roller 1) for the washing tank 16 (first washing tank) and is on a washing tank 17 side and (ii) a position which is of a roller (corresponding to the roller b) for the washing tank 17 (second washing tank) and is on a washing tank 16 side. Here, the "position which is of a roller (corresponding to the roller 1) for the washing tank 16 and is on a washing tank 17 side" is a position at which the heat-resistant separator S is taken out from water in the washing tank 16. The "position which is of a roller (corresponding to the roller b) for the washing tank 17 and is on a washing tank 16 side" is a position at which the heat-resistant separator S is brought into the water in the washing tank 17.

<<Operation in which Heat-Resistant Separator is Washed with Use of Multi-Stage Washing Tank>>

The washing method in accordance with Embodiment 1 includes a step of transferring the heat-resistant separator S in a lengthwise direction of the heat-resistant separator S and a step of washing the heat-resistant separator S, which is being transferred, by causing the heat-resistant separator S to sequentially pass through washing waters W in the washing tanks 15 through 19. As such, the heat-resistant separator S is sequentially transferred from an upstream washing tank (first washing tank) to a downstream washing tank (second washing tank). Here, unless otherwise noted, the terms "upstream" and "downstream" respectively mean an upstream side and a downstream side in a transferring direction of a separator.

After washing in the washing tanks 15 through 19 has finished, the heat-resistant separator S is transferred to a step (for example, drying step) downstream from the washing step.

<<Effect of Embodiment 1>>

(Washing by Diffusion)

In a case where the heat-resistant separator S passes through the washing water W, IMP diffuses from the pores of the heat-resistant separator S to the water. Here, a diffusion amount of NMP becomes larger as a concentration of NMP in the washing water W is lower.

The heat-resistant separator S is washed sequentially in the washing tanks 15 through 19, and therefore a concentration of NMP in washing water W is lower in a downstream washing tank than in an upstream washing tank. That is, NMP is diffused in stages, and it is therefore possible to reliably remove NMP from the pores.

(Direction in which Washing Water Flows)

As illustrated, in FIG. 4, washing water W can flow in a direction D from the downstream washing tank 19 to the upstream washing tank 15 in the separator transferring direction. From this, for example, partition walls each provided between the washing tanks 15 through 19 can have heights which become lower from the downstream side to the upstream side in the separator transferring direction. In this case, in the washing method in accordance with Embodiment 1, washing water W is supplied to the downstream washing tank and the washing water W in the downstream washing tank is then supplied to an upstream washing tank, and thus the washing method further includes a step of renewing the washing water W in each of the washing tanks. From the upstream washing tank 15, part of the washing water W flows out. With the configuration, it is possible to cause an NMP concentration in washing water W in the downstream washing tank in the separator transferring direction to be lower than an NMP concentration in washing water W in the upstream washing tank, while efficiently using the washing water W.

(Efficient Washing)

By diffusing NMP in stages, it is possible to efficiently remove NMP, as compared with washing in only one washing tank. It is therefore possible to shorten a transferring distance of the heat-resistant separator S during washing. From this, it is possible to wash the heat-resistant separator S whose mechanical, strength is lower than that of a non-porous film while inhibiting a fold, a crease, a tear, and meandering.

<<Other Configuration>>

(Circulation of Washing Water)

As a width of the heat-resistant separator S becomes broader, productivity increases. Therefore, the width (i.e., a width in a direction perpendicular to the sheet on which FIG. 4 is illustrated) of the heat-resistant separator S is often set to be a width similar to that of the washing tanks 15 through 19. Moreover, the width of the washing tanks 15 through 19 is designed in accordance with the width of the heat-resistant separator S.

In a case where the width of the heat-resistant separator S is broadened and a gap between an end part of the heat-resistant separator S and the washing tanks 15 through 19 becomes smaller, washing water W in each of the washing tanks 15 through 19 is to be separated into one surface side (i.e., center side of washing tank) of the heat-resistant separator S and another surface side (i.e., both end sides of washing tank (right and left sides of washing tank in FIG. 4)) of the heat-resistant separator S.

In the washing in the washing tanks 15 through 19, the washing water W is often supplied/drained by overflow between the washing tanks 15 through 19. In this case, washing water W on the one surface side of the heat-resistant separator S may be supplied/drained, whereas washing water W on the another surface side of the heat-resistant separator S may remain.

In view of this, the washing method in accordance with Embodiment 1 can include a step of circulating washing water W so as to facilitate interchanging of washing waters W between the one surface side and the another surface side of the heat-resistant separator S in at least one of the washing tanks 15 through 19. In this case, the washing device 6 can further include a circulating device which is provided in the at least one of the washing tanks 15 through 19 and has an inlet and an outlet for washing water W.

This makes it possible to further uniformize an NMP concentration in washing water W in one washing tank, and it is therefore possible to facilitate efficient removal of NMP.

(Washing Water)

The washing water W is not limited to water, provided that the washing water W is a washing liquid which can remove NMP from the heat-resistant separator S.

Moreover, the washing water W can contain a cleaning agent such as a surfactant, an acid (e.g., hydrochloric acid), or a base. A temperature of the washing water W is preferably 120° C. or lower. With this temperature condition, heat shrinkage of the heat-resistant separator S is less likely to occur. The temperature of the washing water W is more preferably 20° C. or higher and 100° C. or lower, (Method for Producing Polyolefin Separator)

The above washing method for washing the heat-resistant separator S is applicable to a washing method for washing a separator (polyolefin separator) having no heat-resistant layer.

The separator is formed by stretching a film-shaped polyolefin resin composition which has been obtained by kneading high molecular weight polyolefin such as ultrahigh molecular weight polyethylene and an inorganic filler or a plasticizer. Further, the remove-target substance such as the inorganic filler or the plasticizer is washed, and thus pores of the separator are formed.

An air permeability of a separator in which the remove-target substance has not been washed and remains in pores is lower than an air permeability of a separator in which the remove-target substance does not remain in pores. As the air permeability is lower, movement of lithium ions of a lithium-ion secondary battery including a separator is further interfered with, and consequently output of the lithium-ion secondary battery decreases. Therefore, it is preferable to wash the separator so that the remove-target substance does not remain in the pores of the separator.

A washing liquid for washing a separator containing an inorganic filler is not limited, provided that the washing liquid can remove the inorganic filler from the separator. The washing liquid is preferably an aqueous solution containing an acid or a base.

A washing liquid for washing a separator containing a plasticizer is not limited, provided that the washing liquid can remove the plasticizer from the separator. The washing liquid is preferably an organic solvent such as dichloromethane.

The outline of the above is as follows: that is, the washing method for washing a film-shaped polyolefin resin composition (film) includes the steps of (i) transferring a film, which is long and is an intermediate product of the separator, in a lengthwise direction of the film and (ii) washing the film by causing the film, which is being transferred, to sequentially pass through washing water W in the respective washing tanks 15 through 19.

As such, in FIG. 4, the heat-resistant separator S can serve as a film which is an intermediate product of a separator. Moreover, the washing water W can be an aqueous solution which contains an acid or a base.

The method for producing a polyolefin separator includes (i) a forming step of forming a film which is long, is an intermediate product of a long and porous separator, and contains poly olefin as a main component and (ii) the steps of the above film washing method which steps are carried out after the forming step.

(Method for Producing Laminated Separator)

The present invention encompasses a method for producing a heat-resistant separator S, which is a laminated separator, with use of the washing method for washing the heat-resistant separator S. Here, the heat-resistant separator S is a laminated separator including a porous film 5 (base material) and a heat-resistant layer 4 (functional layer) which is laminated on the porous film 5, as illustrated in FIG. 3. This producing method includes a forming step of forming a long and porous heat-resistant separator S and the steps in the above described separator washing method which steps are carried out after the forming step.

In order to laminate the heat-resistant layer 4, the "forming step" includes an applying step of applying, to the porous film 5, NMP (liquid substance) containing aramid resin (substance) for constituting the heat-resistant layer 4 and a solidifying step of solidifying the aramid resin after the applying step.

The "steps" mean the steps of (i) transferring the heat-resistant resistant separator S in the lengthwise direction thereof and (ii) washing the heat-resistant separator S by causing the heat-resistant separator S, which is being transferred, to sequentially pass through water in the respective washing tanks 15 through 19.

From this, it is possible to produce the laminated separator which hardly contains NMP and in which problems are inhibited. Note that the heat-resistant layer can be the early described adhesive layer.

Embodiment 2

Figure 5:
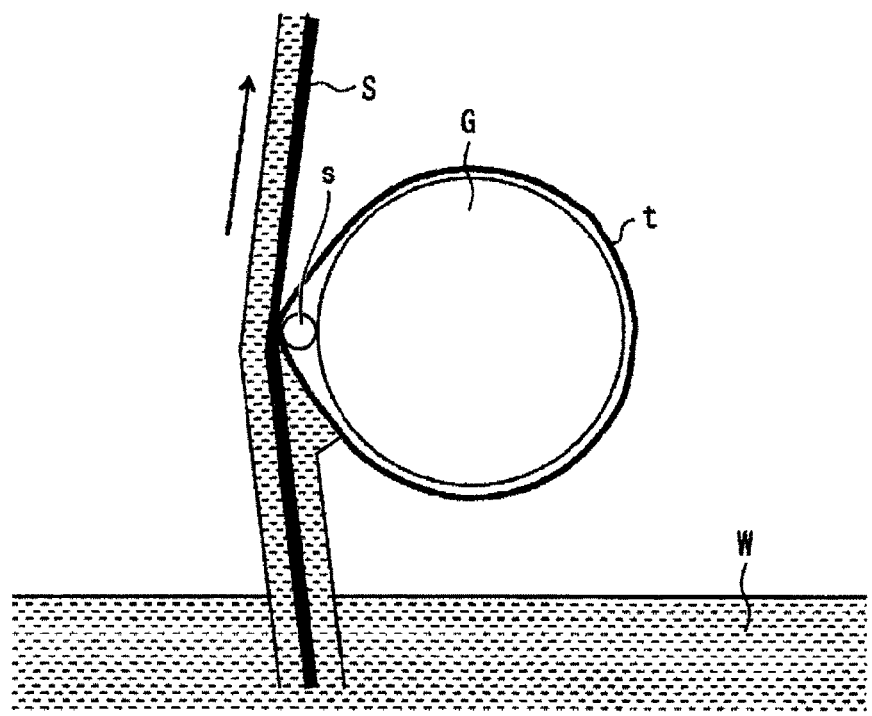
FIG. 5 is a cross-sectional view illustrating a peripheral configuration of a guide roller used in a washing method in accordance with Embodiment 2.

The following description will discuss Embodiment 2 of the present invention with reference to FIG. 5. For convenience of explanation, identical reference numerals are given to constituent members having functions identical with those of the constituent members described in Embodiment 1, and descriptions of such constituent members are omitted here. This applies to other embodiments described below.

<<Configuration in which Washing Water is Removed from Heat-Resistant Separator>>

FIG. 5 is a cross-sectional view illustrating a peripheral configuration of a guide roll G used in a washing method of the Embodiment 2.

As illustrated in FIG. 5, a washing device 6 further includes a guide roll G, a Teflon bar s, and a Teflon tube t. Note that "Teflon" is a registered trademark.

The guide roll G (i) is fixed to a transferring path on which the heat-resistant separator S is transferred, (ii) does not rotate, and (iii) is provided between rollers l and m for a washing tank 15.

The Teflon bar s extends along lengthwise directions of the guide roll G, and is provided on a surface of the guide roll G.

The Teflon tube t confines the guide roll G and the Teflon bar s so as to wrap the guide roll G and the Teflon bar s.

Note that the guide roll G can be provided for any of the washing tanks 16 through 19. Moreover, the washing device 6 can include plural sets of the guide roll G, the Teflon bar s, and the Teflon tube t.

<<Operation in which Washing Water is Removed from Heat-Resistant Separator>>

The washing method of the Embodiment 2 includes, in addition to the steps in the washing method in accordance with Embodiment 1, the step of removing washing water W from the heat-resistant separator S between an upstream washing tank and a downstream washing tank.

In a case where the heat-resistant separator S is pulled up from the water, part of washing water W in the upstream washing tank is, by surface tension, brought to the downstream washing tank along the surface of the heat-resistant separator S. In view of this, the washing water W which is to be brought to the downstream washing tank is scraped off from the heat-resistant separator S.

The Teflon bar s which is provided on the surface of the guide roll G that is fixed serves to form a protrusion on a surface of the Teflon tube t. The protrusion is brought into contact with the heat-resistant separator S so as to softly rub the heat-resistant separator S, and thus scrapes washing water W off from the heat-resistant separator S.

In a case where the heat-resistant separator S is a polyethylene porous film which has one surface coated with a heat-resistant aramid layer, it is preferable to press the protrusion formed on the surface of the Teflon tube t against another surface of the porous film which another surface is not coated with the heat-resistant layer. This makes it possible to prevent detachment of the heat-resistant layer.

<<Effect of Embodiment 2>>

With the configuration in accordance with Embodiment 2, it is possible to reduce washing water W which is to be brought from the upstream washing tank to the downstream washing tank. It is therefore possible to reliably control an NMP concentration in washing water W in the downstream washing tank to be lower than that in washing water W in the upstream washing tank. This leads to reliable removal of NMP from the pores of the heat-resistant separator S.

Embodiment 3

Figure 6:
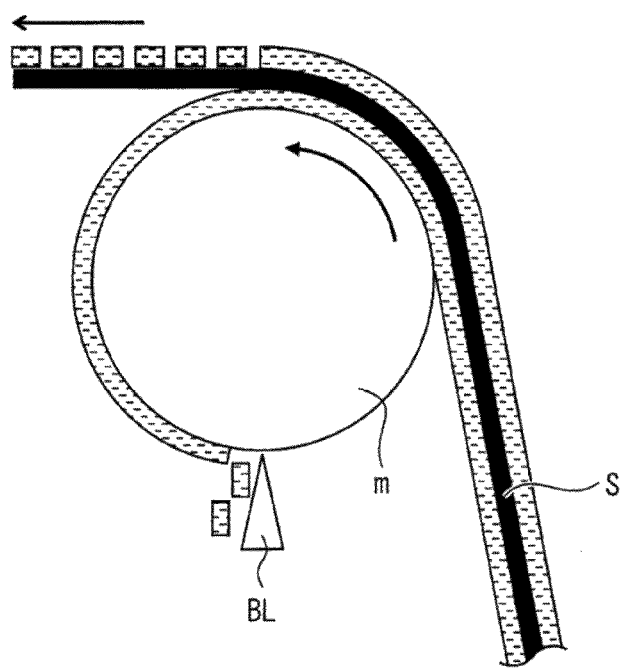
FIG. 6 is a cross-sectional view illustrating a peripheral configuration of a roller used in a washing method in accordance with Embodiment 3.

The following description will discuss Embodiment 3 of the present invention with reference to FIG. 6.

<<Configuration in which Washing Water is Removed from Transferring Roller for Transferring Heat-Resistant Separator>>

FIG. 6 is a cross-sectional view illustrating a peripheral configuration of a roller m used in a washing method in accordance with Embodiment 3.

As illustrated in FIG. 6, a washing device 6 further includes a scrape-off bar BL.

The scrape-off bar BL is a blade for scraping off, by surface tension, washing water W which is transferred along the roller m.

A slight gap is provided between the roller m and the scrape-off bar BL. This prevents damage on a surface of the roller m and abrasion of the scrape-off bar BL each from occurring.

<<Operation in which Washing Water is Removed from Transferring Roller for Transferring Heat-Resistant Separator>>

The washing method in accordance with Embodiment 3 includes, in addition to the steps in the washing method in accordance with Embodiment 1, the step of removing washing water W from the roller m for transferring the heat-resistant separator S between an upstream washing tank and a downstream washing tank.

When the heat-resistant separator S is transferred, part of washing water W is, by surface tension, brought to the downstream washing tank along a surface of the heat-resistant separator S. Further, the part of washing water W which is brought to the downstream washing tank is transferred along the roller m by surface tension. Then, the washing water W transferred along the roller m by surface tension is scraped off from the roller m.

<<Effect of Embodiment 3>>

With the configuration in accordance with Embodiment 3, it is possible to reduce an amount of washing water W which is brought from the upstream washing tank to the downstream washing tank. It is therefore possible to reliably control an NMP concentration in washing water W in the downstream washing tank to be lower than that in washing water W in the upstream washing tank. This leads to reliable removal of NMP from the pores of the heat-resistant separator S.

[Variation 1]

The washing device 6 can include all the guide roll G, the Teflon bar s, the Teflon tube t (which are illustrated in FIG. 5), and the scrape-off bar BL (which is illustrated in FIG. 6).

A washing method of this variation includes, in addition to the steps in the washing method in accordance with Embodiment 1, the steps of removing washing water W from the heat-resistant separator S between the upstream washing tank and the downstream washing tank and removing washing water W from the roller m for transferring the heat-resistant separator S between the upstream washing tank and the downstream washing tank.

With the configuration, it is possible to further reduce an amount of washing water W which is brought from the upstream washing tank to the downstream washing tank, ft is therefore possible to reliably control an NMP concentration in washing water W in the downstream washing tank to be lower than that in washing water W in the upstream washing tank. This leads to further reliable removal of NMP from the pores of the heat-resistant separator S.

[Variation 2]

The washing device 6 can include one washing tank. From this, the present invention encompasses the following aspect:

A separator washing method in accordance with a first aspect of the present invention is a method for washing a battery separator which is long and porous, the separator washing method including the steps of: transferring the battery separator in a lengthwise direction of the battery separator; washing the battery separator by causing the battery separator, which is being transferred, to pass through a washing liquid in a washing tank; and removing the washing liquid from the battery separator between a position at which the battery separator is brought into the washing tank and a position at which the battery separator is taken out from the washing tank.

The first aspect is an aspect in which, for example, washing water W is removed from the heat-resistant separator S (battery separator) by the guide roll G, the Teflon bar s, and the Teflon tube t as illustrated in FIG. 5, in at least one of the washing tanks 15 through 19 which are illustrated in FIG. 4. According to the first aspect, it is possible to reduce an amount of the washing liquid which is to be brought from the washing step to another step.

A separator washing method in accordance with a second aspect of the present invention is a method for washing a battery separator which is long and porous, the separator washing method including the steps of: transferring the battery separator in a lengthwise direction of the battery separator; washing the battery separator by causing the battery separator, which is being transferred, to pass through a washing liquid in a washing tank; and removing the washing liquid from a transferring roller for transferring the battery separator between a position at which the battery separator is brought into the washing tank and a position at which the battery separator is taken out from the washing tank.

The second aspect is an aspect in which, for example, washing water W is removed from the roller m (transferring roller) for transferring the heat-resistant separator S (battery separator) by the scrape-off bar BL as illustrated in FIG. 6, in at least one of the washing tanks 15 through 19 which are illustrated in FIG. 4. According to the second aspect, it is possible to reduce an amount of the washing liquid which is to be brought from the washing step to another step.

A separator washing method in accordance with a third aspect of the present invention is a method for washing a battery separator which is long and porous, the separator washing method including the steps of: transferring the battery-separator in a lengthwise direction of the battery separator; washing the battery separator by causing the battery separator, which is being transferred, to pass through a washing liquid in a washing tank; and circulating the washing liquid in the washing tank so as to facilitate interchanging of washing liquids between one surface side and another surface side of the battery separator.

The third aspect is an aspect in which, for example, washing water W (washing liquid) is circulated so as to facilitate interchanging of washing waters W between the one surface side and another surface side of the heat-resistant separator S (battery separator) in at least one of the washing tanks 15 through 19 which are illustrated in FIG. 4. According to the third aspect, it is possible to further uniformize a concentration of the remove-target substance in the washing liquid in the washing tank, and it is therefore possible to facilitate efficient removal of the remove-target substance.

A separator washing method in accordance with a fourth aspect of the present invention is a method for washing a battery separator which is long and porous, the separator washing method including the steps of: transferring the battery separator in a lengthwise direction of the battery separator; and washing the battery separator by causing the battery separator, which is being transferred, to pass through a washing liquid in a washing tank, in the transferring step, driving force for transfer is applied to the battery separator between a position at which the battery separator is brought into the washing tank and a position at which the battery separator is taken out from the washing tank.

The fourth aspect is an aspect in which, for example, driving force for transfer is applied to the heat-resistant separator S (battery separator) by the driving roller R between a position at which the heat-resistant separator S is brought into the washing tank and a position at which the heat-resistant separator S is taken out from the washing tank which is at least one of the washing tanks 15 through 19 which are illustrated in FIG. 4. According to the fourth aspect, force applied to the battery separator is dispersed, as compared with a case where the battery separator is pulled merely from a location downstream from the part at which the washing step is carried out. As a result, it is possible to inhibit a problem such as cutoff of the battery separator.

Note that, in a case where a mechanism for applying driving force to the battery separator is provided in the washing liquid, the position at which the battery separator is brought into the washing tank can be a position at which the battery separator is brought into the washing water in the washing tank and the position at which the battery separator is taken out from the washing tank can be a position at which the battery separator is taken out from the washing water in the washing tank.

A separator producing method in accordance with a fifth aspect of the present invention includes: a forming step of forming a long and porous battery separator; and steps in the separator washing method in accordance with any one of the first through fourth aspects, the steps in the separator washing method being carried out after the forming step.

In the fifth aspect, for example, a heat-resistant separator S (battery separator) including a porous film 5 and a heat-resistant layer 4 laminated on the porous film 5 (see FIG. 3) are formed, and then the heat-resistant separator S is washed in at least one of the washing tanks 15 through 19 illustrated in FIG. 4. According to the fifth aspect, it is possible to produce the battery separator in which problems are inhibited and which has an air permeability higher than that of a conventional battery separator.

According to a separator producing method in accordance with a sixth aspect of the present invention, it is possible in the fifth aspect that the battery separator is a laminated separator including a base material and a functional layer laminated on the base material; and the forming step includes (i) an applying step of applying a liquid substance containing a substance for constituting the functional layer to the base material so as to laminate the functional layer and (ii) a solidifying step of solidifying the substance after the applying step.

In the sixth aspect, for example, in order to laminate a heat-resistant layer 4 (functional layer) on a porous film 5 (base material) as illustrated: in FIG. 3, NMP (liquid substance) containing aramid resin (substance) for constituting the heat-resistant layer 4 is applied to the porous film 5, the aramid resin is solidified, and the heat-resistant separator S is washed in at least one of the washing tanks 15 through 19 illustrated in FIG. 4. According to the sixth aspect, it is possible to produce the laminated separator in which problems are inhibited and which has an air permeability higher than that of a conventional laminated separator.

A separator washing method in accordance with a seventh aspect of the present invention includes, in a film washing method for obtaining a long and porous battery separator, the steps of: transferring a film which is long and is an intermediate product of the battery separator in a lengthwise direction of the film; and washing the film by causing the film, which is being transferred, to pass through a washing liquid in a washing tank, the film containing polyolefin as a main component.

In the seventh aspect, for example, a polyolefin resin composition obtained by kneading polyolefin and an inorganic filler or a plasticizer is formed into a film, and this film is stretched to be an intermediate product of a heat-resistant separator S (battery separator). Then, the intermediate product is washed in at least one of the washing tanks 15 through 19 illustrated in FIG. 4, and thus the inorganic filler or the plasticizer is washed away. According to the seventh aspect, it is possible to obtain the polyolefin separator in which problems are inhibited and which has an air permeability higher than that of a conventional polyolefin separator.

A separator washing method in accordance with an eighth aspect of the present invention includes: a forming step of forming a film which is long and is an intermediate product of a long and porous battery separator; a transferring step of transferring the film in a lengthwise direction of the film; and a washing step of washing the film by causing the film, which is being transferred, to pass through a washing liquid in a washing tank, the transferring step and the washing step being carried out after the forming step.

In the eighth aspect, for example, a polyolefin resin composition obtained by kneading polyolefin and an inorganic filler or a plasticizer is formed into a film, and this film is stretched to be an intermediate product of a heat-resistant separator S (battery separator). Then, the intermediate product is washed in at least one of the washing tanks 15 through 19 illustrated in FIG. 4. According to the eighth aspect, it is possible to produce the battery separator in which problems are inhibited and which has an air permeability higher than that of a conventional battery separator.

Embodiment 4

Figure 7:
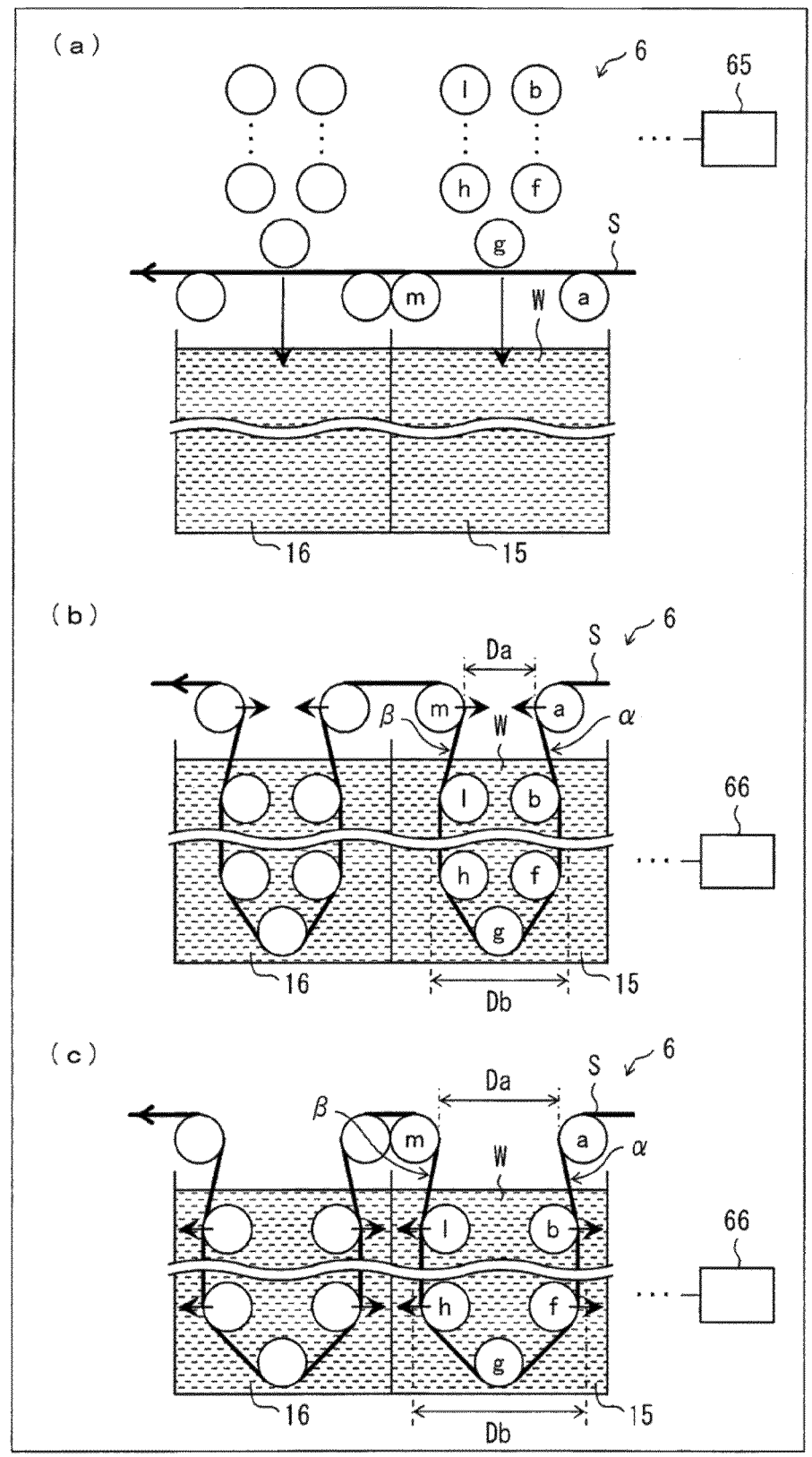
FIG. 7 is a set of schematic views for describing a film production method in accordance with Embodiment 4.
Figure 8:
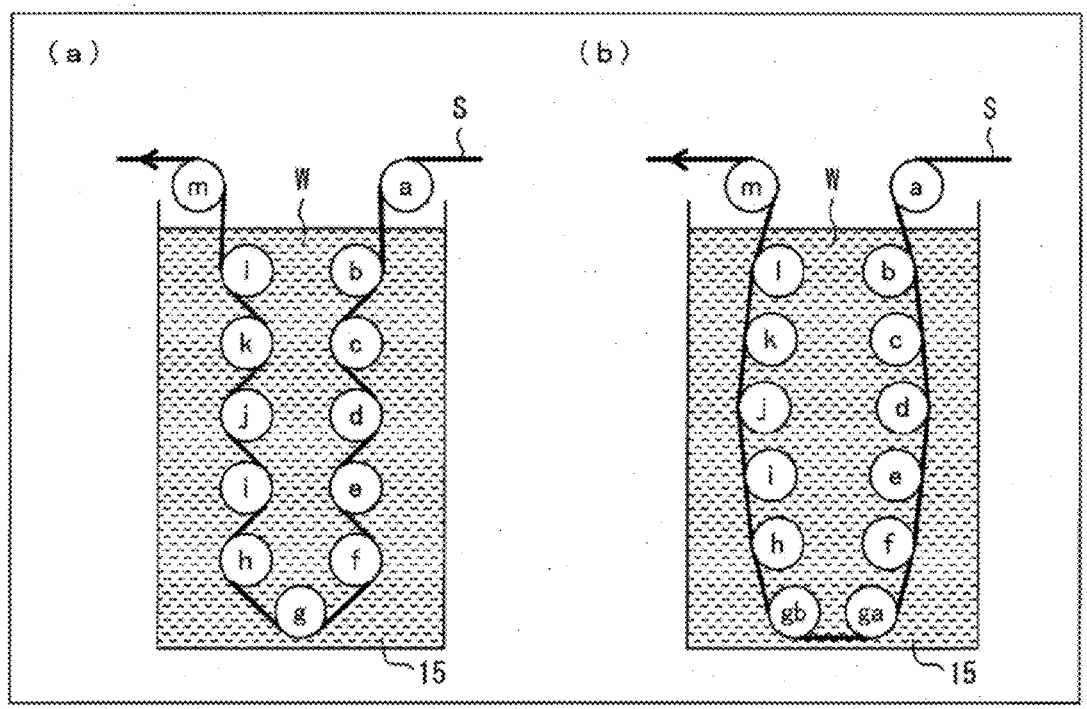
FIG. 8 is a set of views each schematically illustrating a transferring path which is different from a transferring path of a heat-resistant separator illustrated in FIG. 7.
Figure 9:
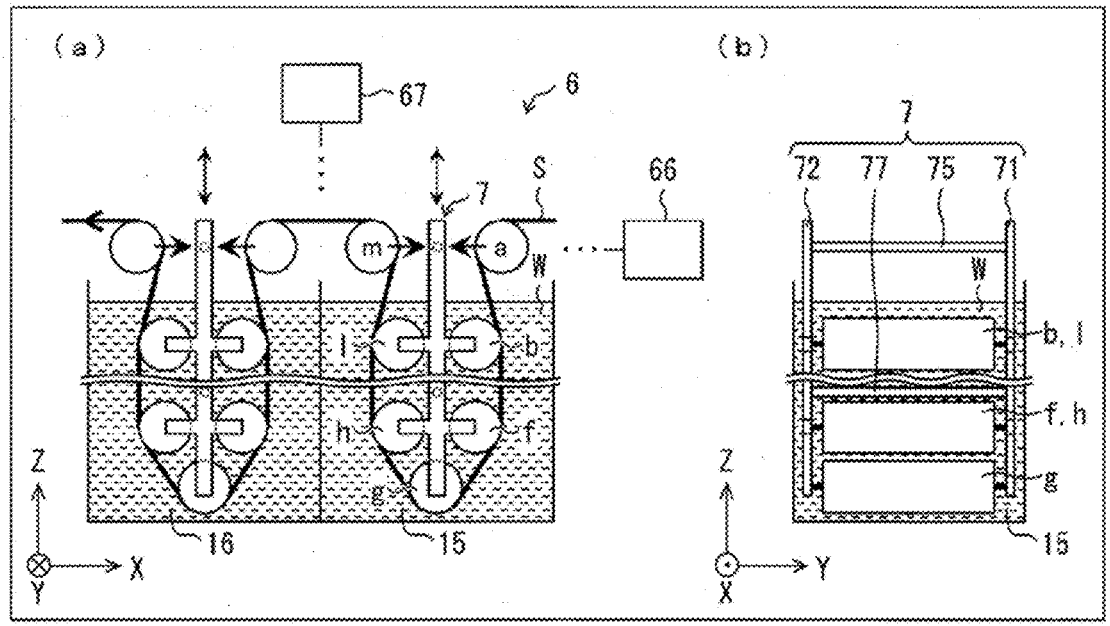
FIG. 9 is a set of views schematically illustrating a configuration in which a connecting member connects rollers illustrated in FIG. 7.

The following description will discuss Embodiment 4 of the present invention with reference to FIGS. 7 through 9.

<<Configuration and Operation for Immersing Film in Washing Tank>>

FIG. 7 is a set of schematic views for describing a film production method in accordance with Embodiment 4, (a) of FIG. 7 shows a heat-resistant separator S before the heat-resistant separator S is immersed in washing water W (hereinafter referred to as "in the water") of a washing tank 15. (b) of FIG. 7 shows the heat-resistant separator S after the heat-resistant separator S has been immersed in the water. Note that FIG. 7 omits rollers c through e and i through k of rollers a through m.

As illustrated, in (a) of FIG. 7, the rollers a through m are located above the washing tank 15 before the heat-resistant separator S is immersed in the water. The roller g is located lowest among the rollers b through l. The heat-resistant separator S is provided so as to pass above the rollers a and m and below the roller g. Note that not all of the rollers b through l need to be located above the rollers a and m.

Then, the rollers b through l are lowered into the water through a space between the rollers a and m. In so doing, at least the roller g, after coming into contact with the heat-resistant separator S, remains in contact with the heat-resistant separator S until the rollers b through l are completely lowered.

As illustrated in (b) of FIG. 7, after the heat-resistant separator S is immersed in the water, the rollers a and m are moved so that the space between the rollers a and m is narrowed. This causes the heat-resistant separator S to be in contact with all of the rollers a through m. Note that the above configuration and operation of the washing tank 15 also apply to the washing tank 16.

<<Effect of Embodiment 4>>

A film production method in accordance with Embodiment 4 is a method for producing a film, the method involving a transfer, in water (in a liquid), of a heat-resistant separator S (film) which is long, the method including the steps of (i) passing the heat-resistant separator S above the roller a (first roller) and the roller m (second roller) which are located above the washing tank 15 (see (a) of FIG. 7); (ii) lowering the rollers b through l (third roller) from above the heat-resistant separator S into water through a space between the rollers a and m; and (iii) moving the rollers a and m so as to increase, a surface area by which the heat-resistant separator S is in contact with the rollers b through l (see (b) of FIG. 7), the steps (i) through (iii) being carried out before the transfer of the heat-resistant separator S.

With the configuration, part of the heat-resistant separator S thus passed in the step (i) is immersed in the water as a result of lowering the rollers b through l in the step (ii), which part is located between (a) a part at which the heat-resistant separator S is in contact with the roller a and (b) a part at which the heat-resistant separator S is in contact with the roller m. This process of thus immersing the heat-resistant separator S is more work-efficient than a process of immersing the heat-resistant separator S by passing the heat-resistant separator S below the rollers b through l located in the water.

In the step (iii), the surface area, by which the heat-resistant separator S is in contact with the rollers b through l lowered into the water, increases. This allows the heat-resistant separator S to be more stably transferred by the rollers b through l, and therefore makes it possible to prevent a problem from occurring to the heat-resistant separator S as a result of transfer failure.

The above configuration brings about an effect of allowing a heat-resistant, separator S to be efficiently produced while the heat-resistant separator S is prevented from encountering a problem. Note the washing tank 16 also brings about an effect similar to the above-described effect of the washing tank 15. In a case where the configuration and operation in accordance with Embodiment 4 are applied to at least one of the washing tanks 15 through 19 illustrated in FIG. 4, it is possible to bring about an effect similar to the above-described effect of the washing tank 15.

(Movement of Rollers in Step (ii))

The rollers b through l are connected to a power device 65, so that the rollers b through l can be elevated and lowered by the power device 65. The power device 65 includes (a) a prime mover such as a, motor and (b) a power transmission mechanism such as a belt.

(Movement of Rollers in Step (iii))

The step (iii) is not limited: to the step of moving the rollers a and m. Alternatively, the step (iii) can be the step of moving at least one of the rollers a and m so as to narrow the space by which the first roller and the second roller are separated in a direction orthogonal to a direction in which the rollers b through l are lowered. This allows a surface area, by which the heat-resistant separator S is in contact with at least one of the rollers b through l, to be increased more efficiently than is the case where only the rollers b through l in the water are moved.

Alternatively, the step (iii) can be the step of moving the rollers b through l as illustrated in (c) of FIG. 7. By such a step (iii), it is possible to increase the surface area by which the heat-resistant separator S is in contact with the rollers b through l. Note that this effect of increasing the surface area, can be obtained by moving at least one of the rollers b through l. Note also that by thus moving a plurality of rollers in the water, it is possible to more freely form a transferring path of the heat-resistant separator S in the water.

Alternatively, it is possible that (a) the step (ii) is the step of lowering at least one of the rollers b through l, that is, one or a plurality of rollers from above the heat-resistant separator S into the water through the space between the rollers a and m and (b) the step (iii) is the step of rearranging (moving) at least one of the rollers a through m so as to increase a surface area by which the heat-resistant separator S is in contact with at least one of the rollers b through l.

With this configuration also, it is possible to increase the surface area by which the heat-resistant separator S is in contact with at least one of the rollers b through l.

The rollers a through m are connected to a rearranging device 66. The rearranging device 66 rearranges the rollers a through m to any positions. The rearranging device 66 includes (a) a prime mover such as a motor and (b) a power transmission mechanism such as a belt.

(Tensile Force of Heat-Resistant Separator S)

Washing water W is circulated in the washing tank 15. Therefore, if the heat-resistant separator S is immersed in the water without applying tensile force to the heat-resistant separator S, then the heat-resistant separator S may flow in the circulating washing water W. This may cause the heat-resistant separator S to encounter a problem.

However, according to Embodiment 4, the washing tank 15 is operated as follows in a case where the heat-resistant separator S is immersed in the water: at least the roller g, after coming into contact with the heat-resistant separator S, remains in contact with the heat-resistant separator S until the rollers b through l are completely lowered. This maintains tensile force applied to the heat-resistant separator S. Therefore, it is possible to reliably prevent the heat-resistant separator S from encountering a problem.

Since the heat-resistant separator S is a porous separator, the heat-resistant separator S is weaker in mechanical strength than a simple non-porous film. Therefore, it is particularly preferable that in the case where the heat-resistant separator S is immersed in the water, tensile force applied to the heat-resistant separator S can be maintained.

(Transferring Path and Retention Length of Heat-Resistant Separator S)

For the purpose of increasing washing efficiency, a distance by which the heat-resistant separator S is transferred in the washing water W (such a distance will be hereinafter referred to as "retention length") is preferably long. Then, the transferring path of the heat-resistant separator S is preferably configured so that a maximum space Db in an orthogonal direction orthogonal to a direction in which the rollers b through l are lowered, which maximum space Db is formed by the heat-resistant separator S being transferred, is larger than a space Da by which the rollers a and m are separated in the orthogonal direction. This makes it possible to secure a long retention length of the heat-resistant separator S. The maximum space Db is specifically a maximum space in the orthogonal direction between (i) a part α of the heat-resistant separator S, which part α is being lowered in the water and (ii) a part β of the heat-resistant separator S, which part β is being elevated in the water.

FIG. 8 is a set of views each schematically illustrating a transferring path which is different from the transferring path of the heat-resistant separator S illustrated in (b) of FIG. 7. (a) of FIG. 7 illustrates a transferring path on which a heat-resistant separator S is transferred in a zigzag pattern. (b) of FIG. 7 illustrates a transferring path on which a heat-resistant separator S is transferred along a bottom surface of the washing tank 15.

In the example shown in (a) of FIG. 8, surfaces of the heat-resistant separator S, which surfaces are in contact with respective rollers c, e, i, and k, are different from those illustrated in (b) of FIG. 7. This may allow a longer retention length of the heat-resistant separator S than is the case of the configuration in which the rollers b through l are in contact with a single surface of the heat-resistant separator S.

In a case where the heat-resistant separator S is a laminated film obtained by coating one surface with a functional layer, it may be preferable to transfer the heat-resistant separator S so that the functional layer does not come into contact with any of the rollers b through l in the water, in such a case, it is preferable to (i) cause the rollers b through l to be in contact with a single contact surface of the heat-resistant separator S in the water as illustrated in (b) of FIG. 7 and (ii) provide the contact surface on a surface of the heat-resistant separator S opposite a surface coated with a functional layer. In order to achieve this configuration, it is only necessary to cause, in the above step (i), the functional layer of the heat-resistant separator S to face downwards. This restricts degradation of the functional layer of the heat-resistant separator S.

The example shown in (b) of FIG. 8 is different from the example shown in (b) of FIG. 7 in that rollers ga and gb, instead of the roller g, are provided in the vicinity of the bottom surface of the washing tank 15. Specifically, two of the rollers b through l are provided along the bottom surface of the washing tank 15 so as to be located closer to the bottom surface than are the other rollers. This makes it possible to secure a long retention length of the heat-resistant separator S.

(Connection of Rollers)

FIG. 9 is a set of views schematically illustrating a configuration in which a connecting member 7 connects the rollers b through l illustrated in (b) of FIG. 7, (a) of FIG. 9 is a schematic view corresponding to (b) of FIG. 7, (b) of FIG. 9 is a schematic view showing the washing device of (a) of FIG. 9 as viewed from a positive side of an X-axis. An X coordinate axis, a Y coordinate axis, and a Z coordinate axis shown in (a) of FIG. 9 correspond to an X coordinate axis, a Y coordinate axis, and a Z coordinate axis shown in (b) of FIG. 9, respectively. In (b) of FIG. 9, wall surfaces of the washing tank 15 on the positive side of the X-axis are omitted for simplification of the drawing.

As illustrated in (a) of FIG. 9, the washing device 6 further includes the connecting member 7. As illustrated in (b) of FIG. 9, the connecting member 7 includes bearing members 71 and 72 and reinforcing members 75 and 77.

The bearing members 71 and 72 rotatably support a rotation axis of each of the rollers b through l from both ends of the rotation axis. Specifically, (i) the bearing member 71 rotatably supports an end of each of the rollers b through l, which end is located on a positive side of a Y-axis and (ii) the bearing member 72 rotatably supports an end of each of the rollers b through l, which end is located on a negative side of the Y-axis. By thus lowering the plurality of rollers h through l all at once. It is possible to increase work efficiency in the above step (ii).

Note that in (a) and (b) of FIG. 9, the rollers c through e and i through k are omitted for simplification of the drawing. The reinforcing member 75 connects the bearing members 71 and 72 outside the washing water W. The reinforcing member 77 connects the bearing members 71 and 72 in the washing water W. The rollers b through l are more firmly connected to each other by the bearing members 71 and 72 which are connected to each other. In this way, even in a case where, for example, the number of rollers b through l is large, these rollers can be lowered all at once. This further increases the work efficiency in the step (ii).

The connecting member 7 is connected to the power device 67, and can be moved, upwards or downwards by the power device 67. The power device 67 includes (a) a prime mover such as a motor and (b) a power transmission mechanism such as a belt. As described above, the rollers a and m are connected to the rearranging device 66. The rearranging device 66 rearranges the rollers a and m to any positions.

Note that the number and arrangement of the reinforcing member(s) 77 of the connecting member 7 are not limited to those illustrated in (a) and (b) of FIG. 9. The number of the reinforcing member(s) 77 can be changed according to the number and arrangement of the rollers included in the washing device 6.

(Film Production Device)

The present invention also encompasses a film production device including a transferring device for transferring, in water, a heat-resistant separator S which is long, the film production device including: the rollers a and m located above the washing tank 15; the rollers b through l; the power device 65 for lowering for lowering the rollers b through from above the heat-resistant separator S into the water through a space between the rollers a and m; and the rearranging device 66 for rearranging at least one of the rollers a through m so as to increase a surface area by which the heat-resistant separator S is in contact with the rollers b through l. Alternatively, the film production device can include the power device 67 instead of including the power device 65. The film production device can further include the connecting member 7.

Embodiment 5

The following description will discuss Embodiment 5 of the present invention with reference to FIG. 10.

<<Another Configuration for Immersing Film in Washing Tank>>

FIG. 10 is a set of schematic views for describing a film production method in accordance with Embodiment 5. (a) of FIG. 10 shows a heat-resistant separator S before the heat-resistant separator S is immersed in washing water W (hereinafter referred to as "in the water") of a washing tank 15. (b) of FIG. 10 shows the heat-resistant separator S after the heat-resistant separator S has been immersed in the water.

As illustrated in (a) of FIG. 10, a washing device 6a further includes rollers n and o in addition to the members included in the washing device 6 illustrated in FIG. 7. As illustrated in (b) of FIG. 10, the rollers a and n are connected to each other, and are configured to turn around a turning shaft 611 which is provided parallel to respective rotation axes of the rollers a and n. Rollers m and o are connected to each other, and are configured to turn around a turning shaft 621 which is provided parallel to respective rotation axes of the rollers m and o.

Hereinafter, a pair of the rollers a and n will be referred to as a pair of rollers 61, and a pair of the rollers m and o will be referred to as a pair of rollers 62.

<<Another Operation for Immersing Film in Washing Tank>>

Before a heat-resistant separator S is immersed in the water, the rollers a through o are located above the washing tank 15. The rollers b through l are located above the rollers a, m, n, and o. The roller g is located lowest among the rollers b through l. The heat-resistant separator S is provided so as to pass above the rollers a, m, n, and o and below the roller g. Note that not all of the rollers b through l need to be located above the rollers a, m, n, and o.

Then, the rollers b through l are lowered into the water through a space between the pairs of rollers 61 and 62. In so doing, at least the roller g, after coming into contact with the heat-resistant separator S, remains in contact with the heat-resistant separator S until the rollers b through l are completely lowered.

As illustrated in (b) of FIG. 10, the pair of rollers 61 is configured so that after the heat-resistant separator S is immersed, in the water, the pair of rollers 61 turns leftwards by 90° around the turning shaft 611 of the rollers a and n such that the roller a is located further downstream than is the roller n in a direction in which the heat-resistant separator S is transferred. The pair of rollers 62 is configured to turn leftwards by 90° around the turning shaft 621 of the rollers m and o such that the roller m is located further downstream than is the roller o in the direction in which the heat-resistant separator S is transferred. This narrows a space between the rollers a and o, so that the heat-resistant separator S comes into contact with all of the rollers a through o.

The pairs of rollers 61 and 62 are connected to a turning device 66a (rearranging device). The turning device 66a allows the pairs of rollers 61 and 62 to turn by any angles and in any directions. In other words, (i) the turning device 66a rearranges the rollers a and n to any positions which are on an orbit of the pair of rollers 61 and are symmetric with respect to the turning shaft 611 and (ii) the turning device 66a rearranges the rollers m and o to any positions which are on an orbit of the pair of rollers 62 and are symmetric with respect to the turning shaft 621, Alternatively, (I) the pair of rollers 61 can turn rightwards by 90° around the turning shaft 611 of the rollers a and n such that the roller a is located further upstream than is the roller n in the direction in which the heat-resistant separator S is transferred and (ii) the pair of rollers 62 can turn rightwards by 90° around the turning shaft 621 of the rollers m and o such that the roller m is located further upstream than is the roller o in the direction in which the heat-resistant separator S is transferred.

The above configuration and operation of the washing tank 15 also apply to the washing tank 16.

<<Effect of Embodiment 5>>

A film production method in accordance with Embodiment 5 is a method for producing a film, the method involving a transfer, in water (in a liquid), of a heat-resistant, separator S (film) which is long, the method including the steps of (i) passing the heat-resistant separator S above the roller a (first roller), the roller m (fourth roller), the roller n (fourth roller), and the roller o (second roller) which are located above the washing tank 15 (see (a) of FIG. 10); (ii) lowering the rollers b through l (third, roller) from above the heat-resistant separator S into water through a space between the pairs of rollers 61 and 62; and (iii) turning the pairs of rollers 61 and 62 so as to increase a surface area by which the heat-resistant separator S is in contact with the rollers b through l (see (b) of FIG. 10), the steps (i) through (iii) being carried out before the transfer of the heat-resistant separator S.

With the configuration, part of the heat-resistant separator S thus passed in the step (i) is immersed in the water as a result of lowering the rollers b through l in the step (ii), which part is located between (a) a part at which the heat-resistant separator S is in contact with the pair of rollers 61 and (b) a part at which the heat-resistant separator S is in contact with the pair of rollers 62. This process of thus immersing the heat-resistant separator S is more work-efficient than a process of immersing the heat-resistant separator S by passing the heat-resistant separator S below the rollers b through l located in the water.

In the step (iii), the surface area, by which the heat-resistant separator S is in contact with the rollers b through l lowered into the water, increases. This allows the heat-resistant separator S to be more stably transferred by the rollers b through l, and therefore makes it possible to prevent a problem from occurring to the heat-resistant separator S as a result of transfer failure.

The above configuration brings about an effect of allowing a heat-resistant separator S to be efficiently produced while the heat-resistant separator S is prevented from encountering a problem. Note the washing tank 16 also brings about an effect similar to the above-described effect of the washing tank 15. In a case where the configuration and operation in accordance with Embodiment 4 are applied to at least one of the washing tanks 15 through 19 illustrated in FIG. 4, it is possible to bring about an effect similar to the above-described effect, of the washing tank 15.

(Turning of Rollers at Boundary Between Washing Tanks)

As illustrated in (a) of FIG. 10, the pair of rollers 62 is provided above a wall surface of the washing tank 15, which wall surface serves as a boundary between the washing tanks 15 and 16. As illustrated in (b) of FIG. 10, the rollers m and o of the pair of rollers 62 turn in the same direction. That is, the rollers m and o each turn leftwards by 90° around the turning shaft 621 of the rollers m and o. This causes, in the step (iii), a space E between the rollers a and o of the washing tank 15 to be narrowed, and causes, in the step (iii), a space F between the roller m of the washing tank 16 and a roller na located above the washing tank 16 to be narrowed. In this way, a surface area, by which the heat-resistant separator S is in contact with the rollers b through l, can be increased more efficiently than is the case where rearrangement of the rollers is carried out in the washing tanks 15 and 16 independently of each other.

(Turning of Plurality of Pairs of Rollers in Same Direction)

As illustrated in (b) of FIG. 10, the pairs of rollers 61 and 62 turn in the same direction. In particular, the roller a of the pair of rollers 61, which roller a is in contact with the heat-resistant separator S in (a) of FIG. 10, and the roller m of the pair of rollers 62, which roller m is likewise in contact with the heat-resistant separator S in (a) of FIG. 10, are turning in the same direction in (b) of FIG. 10. This prevents friction force from being applied to the heat-resistant separator S as a result of rearrangement of the rollers a and m, and therefore prevents the heat-resistant separator S from being stretched as a result of the friction force.

(Re-Turning of Pairs of Rollers)

After the pairs of rollers 61 and 62 turn, the pairs of rollers 61 and 62 can turn by any angles and in any directions again. In so doing, it is preferable that after the pairs of rollers 61 and 62 turn once, the pairs of rollers 61 and 62 can turn again so as to turn to the opposite direction by the same angle to return to the respective original positions. For example, in a case where the pairs of rollers 61 and 62 turned leftwards by 90% then the pairs of rollers 61 and 62 are preferably able to turn rightwards by 90°.

SUMMARY

A film production method of the present invention is a method for producing a film, the method involving a transfer, in a liquid provided in a liquid tank, of a film which is long, the method comprising the steps of: (i) passing the film above a first roller and a second roller which are located above the liquid tank; (ii) lowering at least one third roller from above the film into the liquid through a space between the first roller and the second roller; and (iii) rearranging at least one of the first roller, the second roller, and the at least one third roller so as to increase a surface area by which the film is in contact with the at least one third roller, the steps (i) through (ii) being carried out before the transfer of the film.

With the method, part of the film thus passed in the step (i) is immersed in the liquid in the liquid tank as a result of lowering the at least one third roller in the step (ii), which part is located between (a) a part at which the film is in contact with the first roller and (b) a part at which the film is in contact with the second roller. This process of thus immersing the film is more work-efficient than a process of immersing the film by passing the film below the roller located in the liquid.

In the step (iii), the surface area, by which the film is in contact with the at least one third roller, increases. This allows the film to be more stably transferred by the at least one third roller, and therefore makes it possible to prevent a problem from occurring to the film as a result of transfer failure.

With the above configuration, it is possible to efficiently produce a film while a problem that occurs to the film is inhibited.

The film production method of the present invention is preferably configured so that a maximum space in an orthogonal direction orthogonal to a direction in which the at least one third roller is lowered, which maximum space is formed by the film being transferred, is larger than a space by which the first roller and the second roller are separated in the orthogonal direction.

With the above method, it is possible to secure a long film transferring path in the liquid.

The film production method of the present invention is preferably configured so that in the step (iii), at least one of the first roller and the second roller is moved so as to narrow a space by which the first roller and the second roller are separated in an orthogonal direction orthogonal to a direction in which the at least one third roller is lowered.

With the above method, the surface area, by which the film is in contact with at least one third roller, can be increased more efficiently than is the case where only the at least one third roller in the liquid is moved.

The film production method of the present invention is preferably configured so that in the step (iii), the at least one of the first roller and the second roller is turned around a turning shaft provided parallel to a rotation axis of the at least one of the first roller and the second roller.

The film production method of the present invention is preferably configured so that: the at least one of the first roller and the second roller is provided above a wall surface of the liquid tank; and the at least one of the first roller and the second roller is connected to a fourth roller which is turned in the step (iii) around the turning shaft in a direction in which the at least one of the first roller and the second roller is turned.

According to the above method, the following is true: Assume a case where, for example, (i) the at least one of the first roller and the second roller is the second roller and (ii) there is another liquid tank (hereinafter referred to as "second liquid tank") which is configured as is the above liquid tank (hereinafter referred to as "first liquid tank") and which is provided on a side of the first liquid tank where the second roller is provided. In such a case, it is possible to turn, in the step (iii), the second roller and the fourth roller so that (a) the second roller moves on the first liquid tank-side and (b) the fourth roller, which is connected to the second roller, moves to the second liquid tank-side. This narrows, in the first liquid tank, a space between the first roller and the second roller, and narrows, in the second liquid tank, a space between the fourth roller and another roller provided above the second liquid tank. Therefore, a surface area, by which the film is in contact with the at least one third roller, can be increased more efficiently than is the case where rearrangement of the rollers is carried out in a plurality of liquid tanks independently of each other.

The film production method of the present invention is preferably configured so that in the step (iii), the first roller and the fourth roller are turned in a same direction.

With the above method, it is possible to prevent friction force from being applied to the film as a result of rearrangement of the first roller and the fourth roller, and therefore prevent the film from being stretched as a result of the friction force.

The film production method of the present invention is preferably configured so that: the at least one third roller is a plurality of third rollers; and in the step (iii), at least one of the plurality of third rollers is moved.

With the above methods it is possible to freely form a film transferring path in the liquid.

The film production method of the present invention is preferably configured so that in the step (iii), two of the plurality of third rollers are provided along a bottom surface of the liquid tank.

With the above method, it is possible to secure an even longer film transferring path in the liquid.

The film production method of the present invention is preferably configured so that the plurality of third rollers are connected to each other.

With the above method, work efficiency in the step (ii) is increased by lowering the plurality of third rollers all at once.

The film production method of the present invention is preferably configured so that: one end parts of the respective plurality of third rollers are connected to each other by a first bearing member; the other end parts of the respective plurality of third rollers are connected to each other by a second bearing member: and the first bearing member and the second bearing member are connected to each other.

With the above method, the plurality of third rollers are more firmly connected to each other by the first hearing member and the second bearing member which are connected to each other. In this way, a greater number of the plurality of third rollers can be lowered all at once. This further increases the efficiency in the step (ii).

The film production method of the present invention is preferably configured so that: the film is a laminated film obtained by coating one surface with a functional layer; and in the step (i), the functional layer of the film faces downwards.

With the above method, it is possible to (i) cause the third rollers to be in contact with a single contact surface of the film in the liquid and (ii) provide the contact surface on a surface of the film opposite a surface coated with a functional layer. This restricts degradation of the functional layer of the film.

A film production device of the present invention is film production device including a transferring device for transferring, in a liquid provided in a liquid tank, a film which is long, the film production device including: a first roller and a second roller which are located above the liquid tank; at least one third roller; a power device for lowering the at least one third roller from above the film into the liquid through a space between the first, roller and the second roller; and a rearranging device for rearranging at least one of the first roller, the second roller, and the at least one third roller so as to increase a surface area by which the film is in contact with the at least one third roller.

[Additional Remarks]

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention.

INDUSTRIAL APPLICABILITY

The present invention can be used for washing a film other than a separator.

REFERENCE SIGNS LIST

4 Heat-resistant layer (functional layer)
5 Porous film (base material)
6, 6a Washing device
7 Connecting member
15 through 19 Washing tank (liquid tank)
61, 62 Pair of rollers
65, 67 Power device
66 Rearranging device
66a Turning device (rearranging device)
71, 72 Bearing member
75, 77 Reinforcing member
611, 621 Turning shaft
BL Scrape-off bar
G Guide roll
R Driving roller
S Heat-resistant separator (battery separator, laminated separator, film)
W Washing water (liquid)
a to o, v to z, ga, gb, na Roller (first roller, second roller, third roller, fourth roller)
p, q Auxiliary roller
s Teflon bar
t Teflon tube

The invention claimed is:

1. A method for producing a film, the method involving a transfer of a film in a liquid provided in a liquid tank, the method comprising the steps of:
   (i) passing the film above a first roller and a second roller which are located above the liquid tank;
   (ii) lowering at least one third roller from above the film into the liquid through a space between the first roller and the second roller; and
   (iii) rearranging at least one of the first roller, the second roller, and the at least one third roller so as to increase a surface area by which the film is in contact with the at least one third roller,
   the steps (i) through (iii) being carried out before the transfer of the film, wherein
   a maximum space in an orthogonal direction orthogonal to a direction in which the at least one third roller is lowered, which maximum space is formed by the film being transferred, is larger than a space by which the first roller and the second roller are separated in the orthogonal direction.

2. The method as set forth in claim 1, wherein:
   the at least one third roller is a plurality of third rollers; and
   in the step (iii), at least one of the plurality of third rollers is moved.

3. The method as set forth in claim 2, wherein
   in the step (iii), two of the plurality of third rollers are provided along a bottom surface of the liquid tank.

4. The method as set forth in claim 2, wherein
   the plurality of third rollers are connected to each other.

5. The method as set forth in claim 2, wherein:
   one end parts of the respective plurality of third rollers are connected to each other by a first bearing member;
   the other end parts of the respective plurality of third rollers are connected to each other by a second bearing member; and
   the first bearing member and the second bearing member are connected to each other.

6. The method as set forth in claim 1, wherein:
   the film is a laminated film obtained by coating one surface with a functional layer; and
   in the step (i), the functional layer of the film faces downwards.

7. A method for producing a film, the method involving a transfer, of a film in a liquid provided in a liquid tank, the method comprising the steps of:
   (i) passing the film above a first roller and a second roller which are located above the liquid tank;
   (ii) lowering at least one third roller from above the film into the liquid through a space between the first roller and the second roller; and
   (iii) rearranging at least one of the first roller, the second roller, and the at least one third roller so as to increase a surface area by which the film is in contact with the at least one third roller,
   the steps (i) through (iii) being carried out before the transfer of the film, wherein
   in the step (iii), at least one of the first roller and the second roller is moved so as to narrow a space by which the first roller and the second roller are separated in an orthogonal direction orthogonal to a direction in which the at least one third roller is lowered.

8. The method as set forth in claim 7, wherein
   in the step (iii), the at least one of the first roller and the second roller is turned around a turning shaft provided parallel to a rotation axis of the at least one of the first roller and the second roller.

9. The method as set forth in claim 8, wherein:
   the at least one of the first roller and the second roller is provided above a wall surface of the liquid tank; and
   the at least one of the first roller and the second roller is connected to a fourth roller which is turned in the step (iii) around the turning shaft in a direction in which the at least one of the first roller and the second roller is turned.

10. The method as set forth in claim 9, wherein
    in the step (iii), the first roller and the fourth roller are turned in a same direction.

11. The method as set forth in claim 7, wherein:
    the at least one third roller is a plurality of third rollers; and
    in the step (iii), at least one of the plurality of third rollers is moved.

12. The method as set forth in claim 11, wherein
    in the step (iii), two of the plurality of third rollers are provided along a bottom surface of the liquid tank.

13. The method as set forth in claim 11, wherein
    the plurality of third rollers are connected to each other.

14. The method as set forth in claim 11, wherein:
    one end parts of the respective plurality of third rollers are connected to each other by a first bearing member;

the other end parts of the respective plurality of third rollers are connected to each other by a second bearing member; and the first bearing member and the second bearing member are connected to each other.

15. The method as set forth in claim 7, wherein:

the film is a laminated film obtained by coating one surface with a functional layer; and in the step (i), the functional layer of the film faces downwards.

* * * * *